(12) United States Patent
Kersting et al.

(10) Patent No.: US 6,580,450 B1
(45) Date of Patent: Jun. 17, 2003

(54) VEHICLE INTERNAL IMAGE SURVEILLANCE, RECORDING AND SELECTIVE TRANSMISSION TO AN ACTIVE COMMUNICATIONS SATELLITE

(75) Inventors: Bernard C Kersting, Chattanooga, TN (US); David J Donovan, Hixson, TN (US); Robert M. Pap, Chattanooga, TN (US); Melvin P. Kocher, Ringgold, GA (US); Timothy W. Robinson, Glen Burnie, MD (US)

(73) Assignee: Accurate Automation Corporation, Chattanooga, TN (US)

( * ) Notice: Subject to any disclaimer, the term of this patent is extended or adjusted under 35 U.S.C. 154(b) by 0 days.

(21) Appl. No.: 09/532,737

(22) Filed: Mar. 22, 2000

(51) Int. Cl.[7] ................................................. H04N 7/18
(52) U.S. Cl. ........................ 348/148; 348/144; 348/153
(58) Field of Search ................................ 348/144, 148, 348/149, 143, 153

(56) References Cited

U.S. PATENT DOCUMENTS

| 4,112,818 A | | 9/1978 | Garehime, Jr. |
| 4,630,110 A | * | 12/1986 | Cotton et al. ................ 348/153 |
| 4,816,829 A | | 3/1989 | Podolak et al. |
| 4,839,439 A | | 6/1989 | Mauz |
| 5,283,643 A | | 2/1994 | Fujimoto |
| 5,508,736 A | * | 4/1996 | Cooper ........................ 348/144 |
| 5,570,127 A | | 10/1996 | Schmidt |
| 5,742,336 A | * | 4/1998 | Lee ............................. 348/144 |
| 5,809,079 A | | 9/1998 | Hayashi |
| 5,883,586 A | | 3/1999 | Tran et al. |

* cited by examiner

Primary Examiner—Chris Kelley
Assistant Examiner—Allen Wong
(74) Attorney, Agent, or Firm—Eric P. Schellin

(57) ABSTRACT

A vehicle imaging surveillance and recording system adapted to monitor conditions prevailing during the course of a trip and provided for this purpose cameras are placed in the control station of the vehicle and about the vehicle. At least two recording devices record the output of the cameras. One device records a thirty minute high resolution image. The second device records a two hour lower resolution image. Both devices compress the data that is to be recorded in storage. The output signals yielded from storage are fed into an on-board transmitter to modulate a carrier that is radiated from the vehicle and intercepted by an active communications satellite. These output signals are being transmitted only under certain conditions. One condition is to provide a switch under the control of a crew member in the control station of the vehicle. The other condition provides for automatically switching on the transmission to the satellite when certain parameters occur.

6 Claims, 1 Drawing Sheet

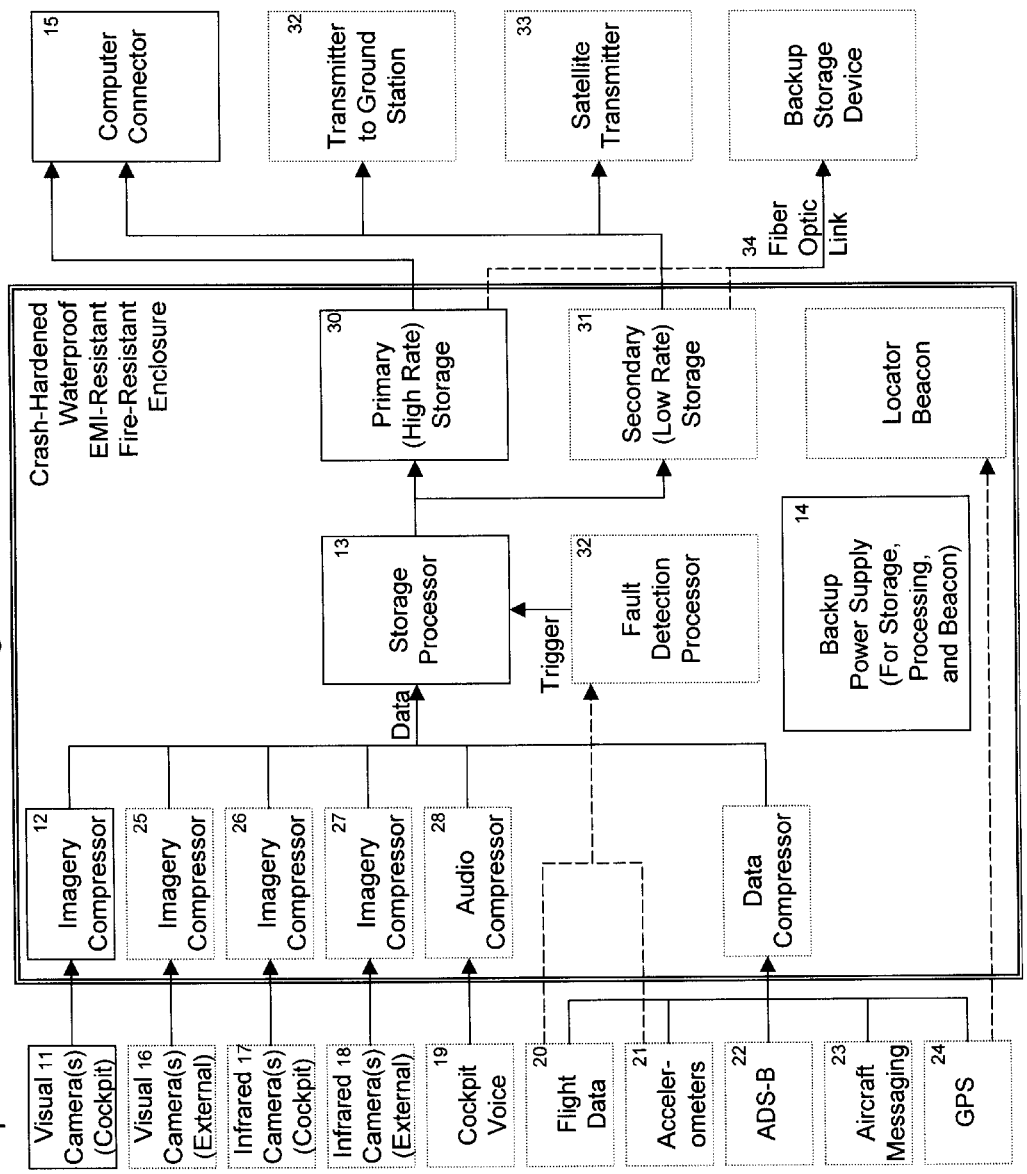

VEHICLE INTERNAL IMAGE SURVEILLANCE, RECORDING AND SELECTIVE TRANSMISSION TO AN ACTIVE COMMUNICATIONS SATELLITE

BACKGROUND OF THE INVENTION

1. Field of Invention

This invention relates generally to vehicle surveillance and recording systems, and in particular to a system of this type in which images and audio are yielded by cameras placed at various positions on the vehicle. At least two recording devices record the output of the cameras. One recording device records a thirty minute high resolution image. A second recording device records a two hour lower resolution image. Both recording devices compress the data while recording. The output signals unloaded from the recording devices are selectively fed into an on-board transmitter to modulate a carrier that is radiated from the vehicle and intercepted by an active communications satellite. The output signals are being fed only under certain conditions. One condition is to provide a switch under the control of an individual having operational control. The other condition is under the provision of a device which switches on automatically when certain predetermined physical parameters occur such as when a preselected gravitational force or other parameter has been exceeded.

2. Status of Prior Art

There has of late been a number of highly publicized airplane catastrophes in which as a result the airplane crashes into ocean waters and becomes submerged. Such catastrophes have heightened public concern with aircraft safety. It has also raised relatively serious questions regarding the effectiveness of existing techniques for determining the cause of an aircraft disaster.

The principal means heretofore available to an investigator of an aircraft disaster are flight recorders, commonly known as "black-boxes". In a commercial aircraft, there are usually two such black boxes, one being a recorder of instrument panel data, the other a recorder of the voices of the flight crew.

Each box is designed to withstand the rigors of a catastrophic plane crash. While the black boxes can usually be recovered without difficulty when the plane crashes on land, it is much more difficult to recover these boxes should the plane crash in ocean waters and sink to the ocean bed.

Black box recorders provide useful information, such as air speed, altitude, heading and vertical acceleration. They record any conversation of the crew in the cockpit and in the flight deck area. Such conversations may reveal what the crew believed to be taking place when an incident occurs resulting in the disaster.

As pointed out in the Feher U.S. Pat. No. 4,816,829, black box data is inadequate for a complete analysis of the conditions prevailing at the time of an accident. Thus, while the airplane instrumentation is monitored and recorded by a black box, external control elements on the airplanes are not monitored, yet what happened to a control element may account for the accident.

In the surveillance system disclosed in the Feher patent, video cameras capture optical images of portions of the plane exterior, while other video cameras capture optical images of portions of the aircraft interior, and also that of the crew. These images are recorded in a protective enclosure within the aircraft designed to survive a crash. Feher provides a telemetry device to transmit the video images to a ground recording station.

A serious drawback of the Feher surveillance system is that the ability of the plane to transmit the video images which monitor the flight is strictly limited to its range of transmission. Thus while the ground recording station may be able to pick up signals transmitted from the plane when the plane is within 300 miles of the recording station it may not be able to pick up these signals when the distance is much greater. Moreover, such transmission from a plane is affected by change in the ionosphere in the Earth's upper atmosphere.

The Fujimoto U.S. Pat. No. 5,283,643 notes that black boxes are not suitable for small aircraft. Instead of black boxes, the small plane is provided with a video camera in the cockpit and a video camera facing the nose of the fuselage to provide image information that is fed to a video recorder. However, whatever video information is recorded remains on the plane, hence in the event of a crash, it may be difficult to recover such a recording. The Bellman et al U.S. Pat. No. 4,839,439 discloses an aircraft surveillance system having audio as well as video sensors placed in the plane interior to produce signals which are transmitted to a ground recording station. While this system is intended to monitor what is taking place on the plane, and the recordings at the ground station will survive a crash, the system is limited in its effectiveness to a relatively short distance between the transmitting plane and the receiving ground station.

The patent to Lee U.S. Pat. No. 5,742,335 progresses a step further by transmitting the signals from on board and plurality of differently positioned video cameras to an active communications satellite. The satellite relays the signals to a ground recording station whose stored recording of the real time images from the cameras is available to investigators should an accident or other incident occur in the course of the flight. The system includes at least four video cameras, the first of which has an audio function and is trained on the flight crew in the cockpit of the plane. The second video camera is focused on the instrument panel and controls in the cockpit. The third camera, which has an audio function looks into the passenger cabin while the fourth camera is mounted on top of the aircraft rudder to observe exterior surface control movements, such as those of flaps, ailerons and elevators.

SUMMARY OF THE INVENTION

In view of the foregoing, the main object of this invention is to provide a vehicle surveillance and recording system having cameras both at interior and exterior positions on the vehicle to monitor the conditions prevailing in the course of a trip by the vehicle, the signals produced by the cameras being recorded in the vehicle and selectively transmitted to an active communications satellite from which it is transmitted to a ground station, whereby in the event of a disaster, an investigator is given access to the ground station recording to determine the cause of the disaster.

More particularly, an object of this invention is to provide a system of the above type in which image and/or audio signals produced by the cameras are transmitted to an active communication satellite which relays these signals to a ground recording station whereby the signals are received by the ground station regardless of its distance from the transmitting vehicle.

A significant advantage of the invention is that unlike black boxes, it affords visual as well as acoustic data. The invention overcomes the reluctance on the part of the crew of the vehicle to have their activities recorded unless a manually operated switch is turned on to transmit the captured recording on the vehicle to the active communications satellite or conditions exist and appropriate sensors respond to certain conditions which have occurred whereby said recordings are transmitted to the active communications satellite. By employing loop recorders only portions of a trip can be recorded and transmitted, thereby limiting any untoward intrusions to conventional occurrences.

Briefly stated, these objects are attained by a vehicle surveillance and recording system and adapted to monitor conditions prevailing in the course of a trip and provided for this purpose with image producing cameras placed at different positions on the vehicle. Two recording devices record the output of the device. One device records a thirty minute high resolution image. The second device records a two hour lower resolution image. Both recording devices compress the data while recording. The output signals unloaded from the recording devices are selectively fed into an on-board transmitter to modulate a carrier that is radiated from the vehicle and intercepted by an active communications satellite. The output signals are being fed only under certain conditions. One condition, as has been stated, is to provide a switch under the control of an individual charged with operational control. The other condition is under the provision of a device which switches on automatically when certain predetermined physical parameters occur such as when a preselected gravitational force or other parameter has been exceeded.

BRIEF DESCRIPTION OF THE DRAWING

For a better understanding of the invention as well as objects and further features thereof, reference is made to the following detailed description to be read in conjunction with the accompanying drawings, wherein:

The FIGURE schematically illustrates a vehicle surveillance and recording system in accordance with the invention.

DETAILED DESCRIPTION OF THE INVENTION

The FIGURE shows a system configuration. In the minimal configuration illustrated by solid lines, imagery is received from a camera 11, then compressed using an imagery compressor 12, and stored in a solid state storage device 13. The compressor 12 and storage device can operate for a user defined period of time using a backup power supply 14 which is electrically connected to the aforesaid electric powered components. The stored data is retrieved by connecting a computer to an output connector 15. These minimal elements are shown schematically as the preferred embodiment in squares of solid lines in the FIGURE. The optional further elements for additional embodiments are in squares of dashed lines.

Such additional devices include visual camera(s) 15, cockpit infrared camera(s) 17 and external camera(s) 18. Also a cockpit voice sensor 19 may be included. Other elements are a flight data device 20 and accelerometers 21. Also, an Automatic Dependent Surveillance Broadcast (ADS-B) 22 element may be included along with an aircraft messaging device 23. A global positioning satellite (GPS) device 24 may be included. The global positioning satellite (GPS) device 24 can be connected as an input, similarly, as the other aforemention devices.

The data is compressed using known but specialized compression devices, that is, imagery compressor 25 for visual camera(s) 16; imagery compressor 26 for the external infrared camera(s) 17; imagery compressor 27 for the cockpit infrared camera(s) 18; and audio compressor 28 for the cockpit voice sensor 19, then passed to the storage compressor 13. This storage processor sends data to the Primary Storage device 30, but can be configured to send a reduced amount to an optional Secondary Storage device 31.

A fault detection processor 32 uses the flight data device 20 and accelerometers 21 for input to determine when an incident has occurred. When an incident is detected a trigger signal is sent to the storage processor 13. The storage processor 13 uses this signal to prevent the overwriting of critical data in the storage devices 30, 31.

In addition to retrieving data via the computer connector 15, data can be transmitted through a transmitter to ground station 32 or through a satellite transmitter 33 for the secondary storage device 31.

In another embodiment the data from both storage devices 30, 31 can also be sent via a fiber optic link 34 to a backup storage device 35 located in an alternate location on the vehicle.

The processing and storage components of the system are contained in a crash-hardened, waterproof, electromagnetic interference (EMI) resistant, fire-resistant container conventionally associated with "black-boxes" employed on aircraft. The container also contains a backup power supply and, in an embodiment, may contain a locator beacon capable of transmitting a last known GPS location.

The active communications satellite employed with the system of the present invention is an orbiting self-sustaining repeater that receives a signal transmitted from either an Earth station or an aircraft at one frequency or band of frequencies and simultaneously retransmits these signals on another frequency or band of frequencies. The retransmission of the signal at different frequencies is necessary to avoid feedback problems.

Such satellites orbit the Earth in synchronous orbits whereby the satellites always remain at the same azimuth and elevations. A transmission from an active communications satellite orbiting the Earth is unaffected by changing ionospheric conditions and they therefore offer reliable and predictable communications circuits.

The satellite relays the signals received from the vehicle to a ground recording station. This station records in a tape recorder the received signals and maintains the recording in storage for a period sufficient to permit playback by an investigator who is seeking to determine the cause of an incident or accident that occurred in the course of the recorded trip.

With a modem tape recorder or monitor, one is able to selectively present on a screen either a composite image containing all of the images obtained by the plurality of cameras or to magnify any one of the images.

As the system of the present invention is operated in conjunction with a communications satellite, the system can be used anywhere in the world, for regardless of the location of the vehicle it is in touch with an active communications satellite which picks up the signal transmitted by the vehicle and relays it to a ground recording station.

While there has been shown a preferred embodiment of the invention it is to be understood that many changes may be thereto within the spirit of the invention.

What is claimed is:

1. A vehicle surveillance and recording system adapted to monitor conditions prevailing during the course of a trip by the vehicle and operating in conjunction with an active communication satellite, the vehicle including a control and operation section occupied by an operating crew provided with an instrument panel and controls, said system comprising:

a plurality of cameras positioned at different elected sites in and/or outside the vehicle to yield real-time image signals, one of said cameras being placed in the control and operations section and being focused on said instrument panel and controls, a second of said cameras being placed in the control and operation section to view the faces of the crew, at least one of said cameras incudes an audio function to pick up the voice of the crew; a transmitter installed in said vehicle which selectively generates a radio frequency carrier and is coupled to an antenna which radiates the carrier so that it can be intercepted by the satellite; a first means to apply the signals from the cameras to a first loop recorder adapted and constructed to record a short period of recordation before being overwritten, a second means to apply the signals from the camera to a second loop recorder adapted and constructed to compress a relatively long period of recordation before being overwritten, means to apply the signals form the first and second loop recorders to the transmitter to modulate the carrier whereby the satellite retransmits the modulated carrier, said means to apply the signals from the first and second loop recorders being controlled by manual switch means and by automatic switch means, said automatic switch means adapted and constructed to be sensitive to predetermined operating condition of the vehicle; a ground recording station adapted to receive retransmitted signals form the satellite and to record and store these signals, including those exhibiting the instrument panel and controls as well as the crew and their voices whereby an investigator of an event involving the vehicle, by playing the recording, can then analyze the conditions which prevailed at the time of the event.

2. The vehicle surveillance and recording system of claim 1 wherein the vehicle is an aircraft.

3. The vehicle surveillance and recording system of claim 1 wherein at least one of the cameras is a video camera.

4. The vehicle surveillance and recording system of claim 1 wherein the inputs from at least one of the cameras is operationally connected to an electronics compressor and then operationally connected to a storage processor.

5. The vehicle surveillance and recording system of claim 1 wherein the first loop recorder operates for a period of about thirty minutes before being overwritten and the second loop recorder operates for a period of about two hours before being overwritten.

6. The vehicle surveillance and recording system of claim 5 wherein the first loop recorder is of relatively high resolution and the second loop recorder is of relatively lower resolution.

* * * * *